UNITED STATES PATENT OFFICE

GEORG KRÄNZLEIN, HEINRICH GREUNE, AND HEINRICH VOLLMANN, OF HOCHST-ON-THE-MAIN, GERMANY, ASSIGNORS, BY MESNE ASSIGNMENTS, TO GENERAL ANILINE WORKS, INC., OF NEW YORK, N. Y., A CORPORATION OF DELAWARE

COLORING MATTER AND PROCESS OF MAKING SAME

No Drawing. Application filed February 6, 1925, Serial No. 7,390, and in Germany February 16, 1924.
Renewed January 8, 1931.

The present invention relates to dyestuffs of the phenazine series. In German Patents Nos. 365,902 and 368,168 to 368,172 there are described condensation products which are obtained by subjecting hydroxyphenazines or naphthosultam-3.4-phenazines to reaction with 2-chloro-1.4-quinones or their substitution products or with mono- or dichloro-4-naphthosultamquinone.

We have now found that compounds of the general formula:

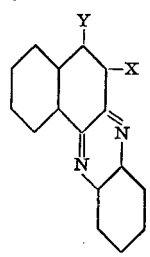

wherein X represents a substituent of the group consisting of hydrogen and halogen and Y represents a substituent of the group consisting of OH, NH$_2$, NH-alkyl and NH-aryl, are capable of reacting, in the presence of an organic solvent, with a 1.4-quinone which is substituted in the positions 2 and 3 by hydrogen. The resulting reaction products are valuable dyestuffs which can be converted by subsequent treatment with an alkaline oxidizing agent into higher oxidation products which likewise are valuable dyestuffs.

The following examples illustrate our invention, the parts being by weight:

1. 123 parts of 1-hydroxy-naphthalene-3.4-phenazine and 54 parts of 1.4-benzoquinone are heated in 3000 parts of nitrobenzene to 140–150° C. until the condensation is complete. The condensation product which crystallizes in green needles dyes animal and vegetable fibres from a reddish-brown vat bright green tints of remarkable properties as to fastness.

The following equation most probably represents the above reaction:

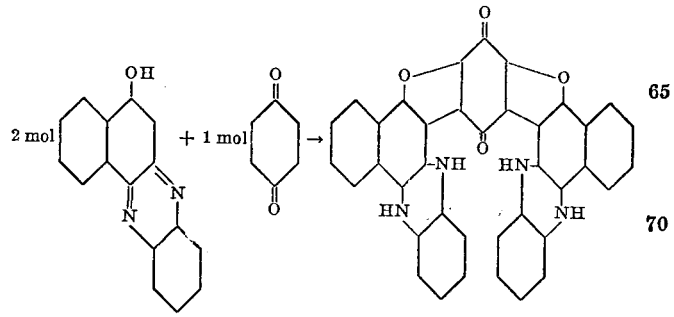

This product, when treated with hypochlorite solution is transformed into a yellow dye-paste consisting essentially of a compound having most probably the formula:

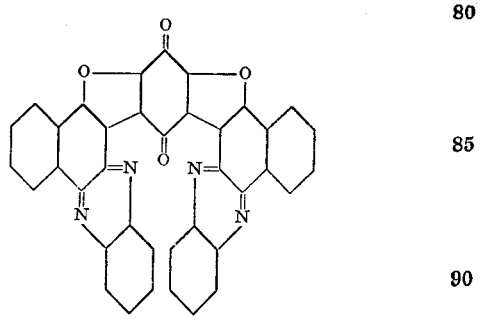

2. 49 parts of 1-amino-naphthalene-3.4-phenazine, 32 parts of 1.4-naphthoquinone and 700 parts of nitrobenzene are heated to 160–170° C. until the condensation is complete. The condensation product is a yellowish-brown body; it dyes from a reddish-brown vat wool and cotton yellow tints.

The following equation most probably represents the reaction:

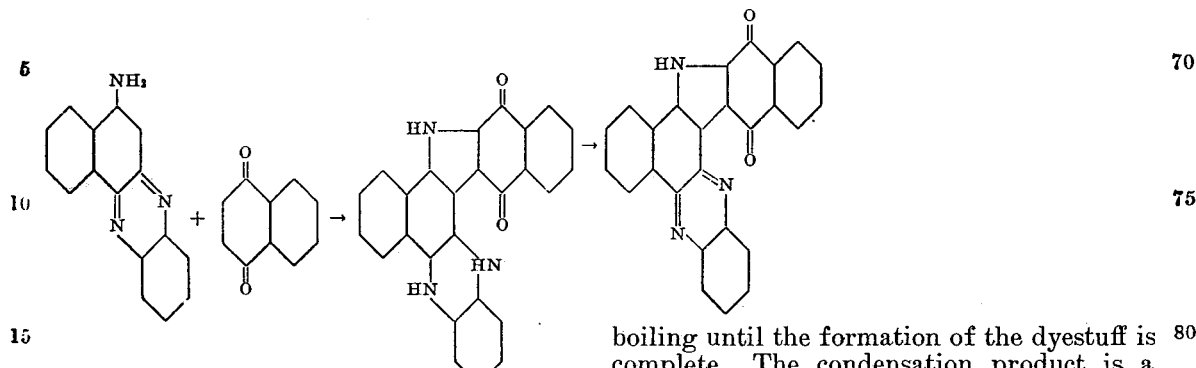

3. 56 parts of 1-hydroxy-2-chlornaphtalene-3.4-phenazine having most probably the formula:

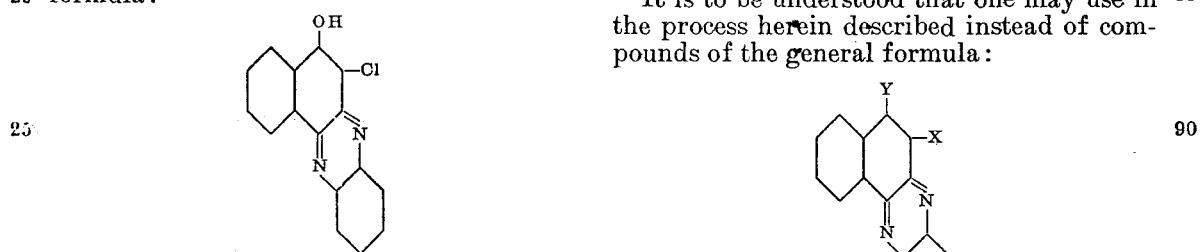

36 parts of 1.4 naphthoquinone, 17 parts of sodium acetate and 300 parts of nitrobenzene are heated together to boiling until the formation of the dyestuff is complete.

After cooling the reaction mixture, the product is washed with alcohol and, if required, the washed condensation product is subjected to an after-treatment with an oxidizing agent.

The following equation most probably represents the reaction:

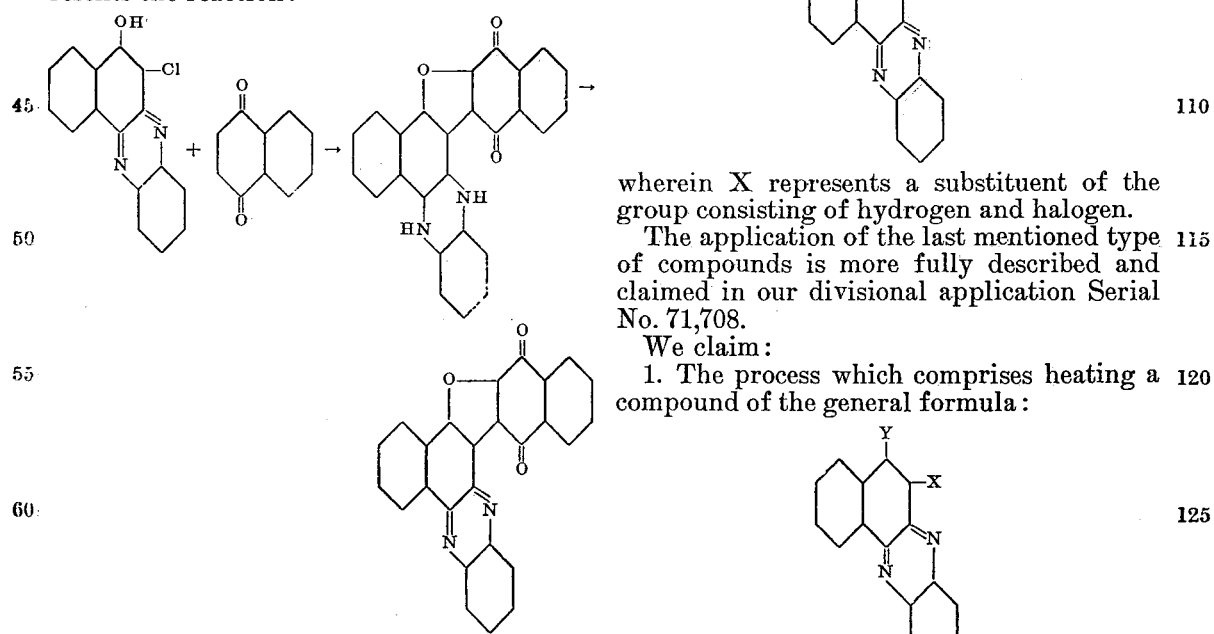

4. 64 parts of 1-phenylamino-naphthalene-3.4-phenazine, 35 parts of 1.4-naphthoquinone and 600 parts of nitrobenzene are heated to boiling until the formation of the dyestuff is complete. The condensation product is a yellowish-brown body which dyes from a reddish-brown vat wool and cotton greenish-yellow tints.

It is to be understood that one may use in the process herein described instead of compounds of the general formula:

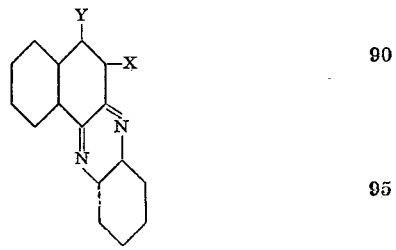

wherein X represents a substituent of the group consisting of hydrogen and halogen, Y represents a substituent of the group consisting of OH, $NH_2$, NH-alkyl and NH-aryl, compounds of the general formula:

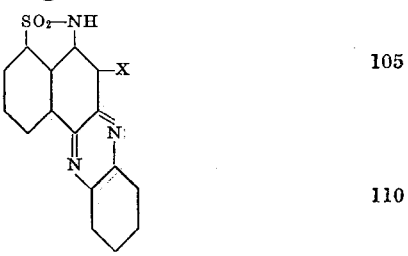

wherein X represents a substituent of the group consisting of hydrogen and halogen.

The application of the last mentioned type of compounds is more fully described and claimed in our divisional application Serial No. 71,708.

We claim:

1. The process which comprises heating a compound of the general formula:

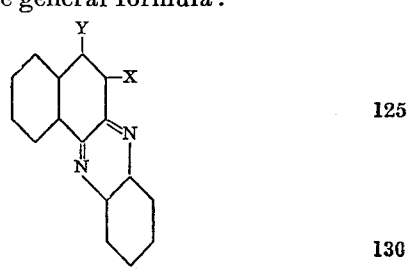

wherein X may be hydrogen or halogen, Y represents a substituent of the group consisting OH, NH₂, NH-alkyl, and NH-aryl with a 1.4-quinone which is unsubstituted in the positions 2 and 3, in the presence of an organic solvent, and treating the resulting condensation product with an alkaline oxidizing agent.

2. The process which comprises heating a compound of the general formula;

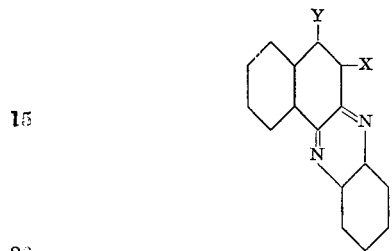

wherein X may be hydrogen or halogen, Y represents a substituent of the group consisting OH, NH₂, NH-alkyl and NH-aryl with a 1.4-quinone which is unsubstituted in the positions 2 and 3, in the presence of nitrobenzene, and treating the resulting condensation product with an alkaline oxidizing agent.

3. The process which comprises heating 1-hydroxy-naphthalene-3.4-phenazine with a 1.4-quinone which is unsubstituted in the positions 2 and 3, in the presence of nitrobenzene, and treating the resulting condensation product with a alkaline oxidizing agent.

4. The process of preparing a dyestuff which consists in heating 1-hydroxy-naphthalene-3.4-phenazine with 1.4-benzoquinone, in the presence of nitrobenzene, and treating the resulting condensation product with an alkaline oxidizing agent.

5. The process of preparing a dyestuff which consists in heating 1-hydroxy-naththalene-3.4-phenazine, in the presence of nitrobenzene, with 1.4-benzoquinone at a temperature of about 140°–150° C., and treating the resulting condensation product with hypochlorite solution.

6. The process which comprises heating a compound of the general formula:

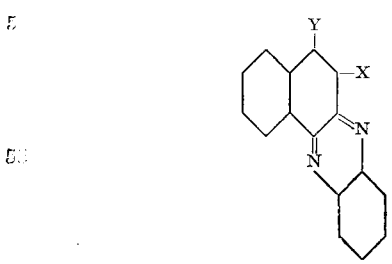

wherein X may be hydrogen or halogen, Y represents a substituent of the group consisting of OH, NH₂, NH-alkyl and NH-aryl, with a 1.4 quinone which is unsubstituted in the positions 2 and 3, in the presence of an organic solvent.

7. The process which comprises heating a compound of the general formula:

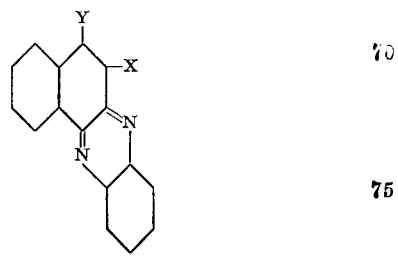

wherein X may be hydrogen or halogen, Y represents a substituent of the group consisting of OH, NH₂, NH-alkyl and NH-aryl, with a 1.4 quinone which is unsubstituted in the positions 2 and 3, in the presence of nitrobenzene.

8. The process which comprises heating 1-hydroxy-naphthalene-3.4-phenazine with a 1.4 quinone which is unsubstituted in the positions 2 and 3, in the presence of nitrobenzene.

9. The process of preparing a dyestuff which consists in heating 1-hydroxy-naphthalene-3.4-phenazine with 1.4-benzoquinone, in the presence of nitrobenzene.

10. The process of preparing a dyestuff which consists in heating 1-hydroxy-naphthalene-3.4-phenazine, in the presence of nitrobenzene, with 1.4-benzoquinone at a temperature of about 140°–150° C.

11. As new products, green compounds of the following probable formula:

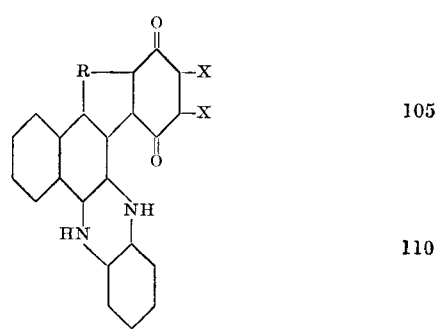

wherein R represents a substituent of the group consisting of O, NH, N-alkyl or N-aryl and the two X's represent a benzene nucleus linked thereto or the residue:

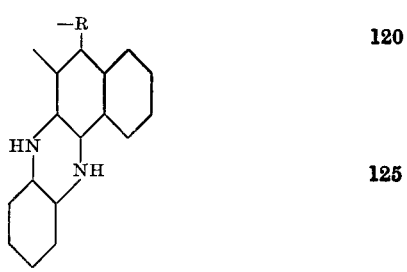

R having the same value as above stated.

12. As new products, green compounds of the following probable formula:

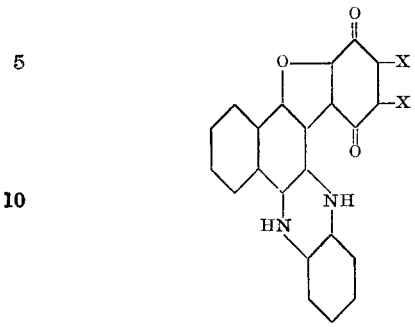

wherein the two X's represent a benzene nucleus linked thereto or the residue:

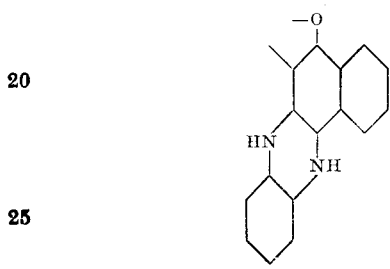

13. As a new product, the green compound of the following probable formula:

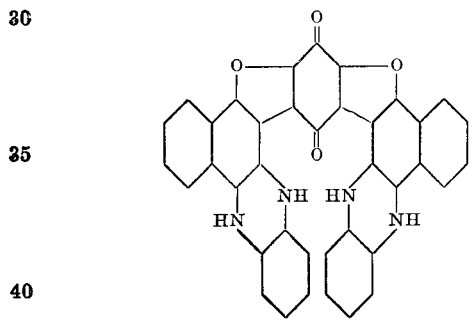

forming a reddish-brown vat from which the animal and vegetable fiber is dyed in green tints and by further treatment with chlorine lye the green tint is turned into a yellow one.

In testimony whereof we affix our signatures.

GEORG KRÄNZLEIN.
HEINRICH GREUNE.
HEINRICH VOLLMANN.